US012204230B2

(12) United States Patent
Putterman et al.

(10) Patent No.: US 12,204,230 B2
(45) Date of Patent: Jan. 21, 2025

(54) WEBCAM PRIVACY SHUTTER

(71) Applicant: Logitech Europe S.A., Lausanne (CH)

(72) Inventors: Drew Putterman, Oakland, CA (US); Kyle Chung, Taipei (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/481,903

(22) Filed: Oct. 5, 2023

(65) Prior Publication Data

US 2024/0142857 A1     May 2, 2024

Related U.S. Application Data

(63) Continuation of application No. 17/900,387, filed on Aug. 31, 2022, now Pat. No. 11,815,787.

(51) Int. Cl.
    G03B 11/04     (2021.01)

(52) U.S. Cl.
    CPC ................... G03B 11/043 (2013.01)

(58) Field of Classification Search
None
See application file for complete search history.

(56) References Cited

U.S. PATENT DOCUMENTS

| D537,095 | S | 2/2007 | Alden et al. |
| D563,446 | S | 3/2008 | Stephens et al. |
| D626,580 | S | 11/2010 | Tzeng |
| D626,983 | S | 11/2010 | Serge et al. |
| D873,882 | S | 1/2020 | Wang |
| D888,124 | S | 6/2020 | Russo et al. |
| D918,982 | S | 5/2021 | Dan |
| D949,224 | S | 4/2022 | Liao |
| D952,017 | S | 5/2022 | Wu |
| D954,777 | S | 6/2022 | Zhao |
| D960,953 | S | 8/2022 | Chen |
| 11,422,433 | B2 * | 8/2022 | Abe .......................... G03B 9/36 |
| 11,467,364 | B2 * | 10/2022 | Wang .................. H02N 2/0055 |
| D973,748 | S | 12/2022 | Cai et al. |

(Continued)

OTHER PUBLICATIONS

U.S. Appl. No. 17/900,387, "Notice of Allowance", Jul. 6, 2023, 10 pages.

(Continued)

*Primary Examiner* — Clayton E. LaBalle
*Assistant Examiner* — Diana Hancock
(74) *Attorney, Agent, or Firm* — Kilpatrick Townsend & Stockton LLP

(57) ABSTRACT

Webcams may include a camera housing having a front cover. The front cover may define a lens aperture and a mounting aperture. A rear surface of the front cover may include a living hinge having a protruding nub. The webcams may include a privacy shutter having a cover member and a generally cylindrical post extending from a rear surface of the cover member at a location offset from a center of the cover member. The post may be disposed within the mounting aperture. A peripheral surface of the post may define a first notch and a second notch positioned opposite one another. The protruding nub may be seated within the first notch when the privacy shutter is in a closed position and seated within the second notch when in an open position. The cover member may cover the lens aperture when the privacy shutter is in the closed position.

6 Claims, 7 Drawing Sheets

(56) References Cited

U.S. PATENT DOCUMENTS

| | | | | |
|---|---|---|---|---|
| 11,815,787 | B1* | 11/2023 | Putterman | G03B 11/043 |
| D1,015,399 | S | 2/2024 | Putterman et al. | |
| D1,036,529 | S | 7/2024 | Putterman et al. | |
| 2010/0079661 | A1* | 4/2010 | Lin | H04N 23/57 |
| | | | | 348/E5.022 |
| 2018/0004068 | A1* | 1/2018 | Chen | G06F 1/1605 |
| 2019/0272005 | A1* | 9/2019 | Wickett | G06F 1/1607 |
| 2022/0373861 | A1* | 11/2022 | Gilliam | G06F 1/1686 |
| 2022/0404684 | A1* | 12/2022 | Goh | G03B 11/043 |
| 2022/0407991 | A1* | 12/2022 | Ushio | H04N 23/56 |

OTHER PUBLICATIONS

U.S. Appl. No. 29/840,690, "Notice of Allowance", Sep. 26, 2023, 8 pages.
U.S. Appl. No. 29/921,331, "Notice of Allowance", Mar. 28, 2024, 8 pages.
CN202230491488.8, "Notice of Decision to Grant", May 24, 2024, 5 pages.

* cited by examiner

WEBCAM PRIVACY SHUTTER

CROSS REFERENCE PARAGRAPH FOR PRIORITY

This application is continuation of U.S. Non-Provisional application Ser. No. 17/900,387, filed on Aug. 31, 2023, and titled "WEBCAM PRIVACY SHUTTER," which is hereby incorporated by reference in its entirety for all purposes.

BACKGROUND OF THE INVENTION

Webcam usage is becoming increasingly common, especially as more employers adopt remote work policies. However, when the webcam is not in use, users may wish to cover the lens of the webcam to ensure that the webcam is not able to capture any unintended footage. Some webcams include privacy shutters that may be selectively moved between open and closed positions that cover the lens when not in use and expose the lens to enable operation of the webcam. However, many of these privacy shutters are difficult to operate and/or may struggle to stay in a desired position, especially after a large number of actuations. Additionally, from longer distances (such as from across a room), it may be difficult to visibly discern whether the privacy shutter is in the open or closed position. Therefore, improvements in privacy shutters for webcams are desired.

BRIEF SUMMARY OF THE INVENTION

Some embodiments of the present technology may encompass webcams. The webcams may include a housing comprising a front cover. The front cover may define a lens aperture and a mounting aperture. A rear surface of the front cover may include a living hinge having a protruding nub. The webcams may include a privacy shutter having a cover member and a generally cylindrical post extending from a rear surface of the cover member at a location offset from a center of the cover member. The post may be disposed within the mounting aperture. A peripheral surface of the post may define a first notch and a second notch positioned opposite one another. The protruding nub may be seated within the first notch when the privacy shutter is in a closed position. The protruding nub may be seated within the second notch when the privacy shutter is in an open position. The cover member may cover the lens aperture when the privacy shutter is in the closed position.

In some embodiments, the protruding nub may be displaced away from the post as the privacy shutter is moved between the closed position and the open position. A width of each of the first notch and the second notch may be between 10 degrees and 40 degrees of the peripheral surface. An amount of force required to disengage the protruding nub from one or both of the first notch and the second notch may be between about 5 N and 10 N. A portion of the cover member may extend outside of periphery of the front cover when the privacy shutter is in the open position. A rear surface of the cover member may include a friction-reducing material. The friction-reducing material may include polytetrafluoroethylene (PTFE). A depth of each of the first notch and the second notch may be between 0.2 mm and 0.6 mm.

Some embodiments of the present technology may encompass webcams that include a housing having a front cover. The front cover may define a lens aperture and a mounting aperture. A rear surface of the front cover may define a void. A living hinge may be disposed within the void. The living hinge may have a protruding nub. The webcams may include a privacy shutter having a cover member and a generally cylindrical post extending from a rear surface of the cover member. The post may be disposed within the mounting aperture. A peripheral surface of the post may define a first notch and a second notch positioned opposite one another. The protruding nub may be seated within the first notch when the privacy shutter is in a closed position. The protruding nub may be seated within the second notch when the privacy shutter is in an open position.

In some embodiments, the living hinge may include a first end region, a second end region, and a medial region disposed between the first end region and the second end region. The first end region may include a first curved portion. The second end region may include a second curved portion. The protruding nub may protrude from the medial region. Each of the first end region and the second end region may be coupled with one or both of a top surface of a portion of the rear surface defining the void and a side surface of the portion of the rear surface defining the void. The webcams may include a screw that couples the post with the front cover of the webcam housing. Rotation of the screw may adjust an amount of force needed to move the privacy shutter between the closed position and the open position. A length of the protruding nub may be between about 1 mm and 3 mm. The living hinge may include polycarbonate.

Some embodiments of the present technology may encompass webcams that include a housing having a front cover. The front cover may define a lens aperture and a mounting aperture. A rear surface may include a living hinge having a protruding nub. The webcams may include a privacy shutter having a cover member and a generally cylindrical post extending from a rear surface of the cover member. The post may be disposed within the mounting aperture. A peripheral surface of the post may define a first notch and a second notch. The protruding nub may be seated within the first notch when the privacy shutter is in a closed position. The protruding nub may be seated within the second notch when the privacy shutter is in an open position.

In some embodiments, the peripheral surface of the post may include a friction-reducing material. The friction-reducing material may include a nanoplastic coating. Each of the first notch and the second notch may have an arc-shape. The cover member may include a domed front surface. A stress on the living hinge may be less than 30 N/m2 when the protruding nub is displaced from a respective one of the first notch and the second notch.

BRIEF DESCRIPTION OF THE DRAWINGS

A further understanding of the nature and advantages of the disclosed technology may be realized by reference to the remaining portions of the specification and the drawings.

Several of the figures are included as schematics. It is to be understood that the FIGS. are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention may be directed to webcam privacy shutters that provide engagement mechanisms that maintain the privacy shutter in the open and closed positions. The engagement mechanisms of the privacy shutters may not only maintain the privacy shutter in the open or closed position until manipulated by a user, but may also provide a tactile feel that alerts a user when the privacy shutter is in the open or closed position. Embodiments of the privacy shutters may be sized to extend beyond a periphery of a housing of the webcam when in the open position, which may enable the privacy shutter to be easily engaged by a user's hand to close the privacy shutter, and may also make it easy to visibly discern whether the privacy shutter is in the open or closed position, even from afar.

Figure 1A:
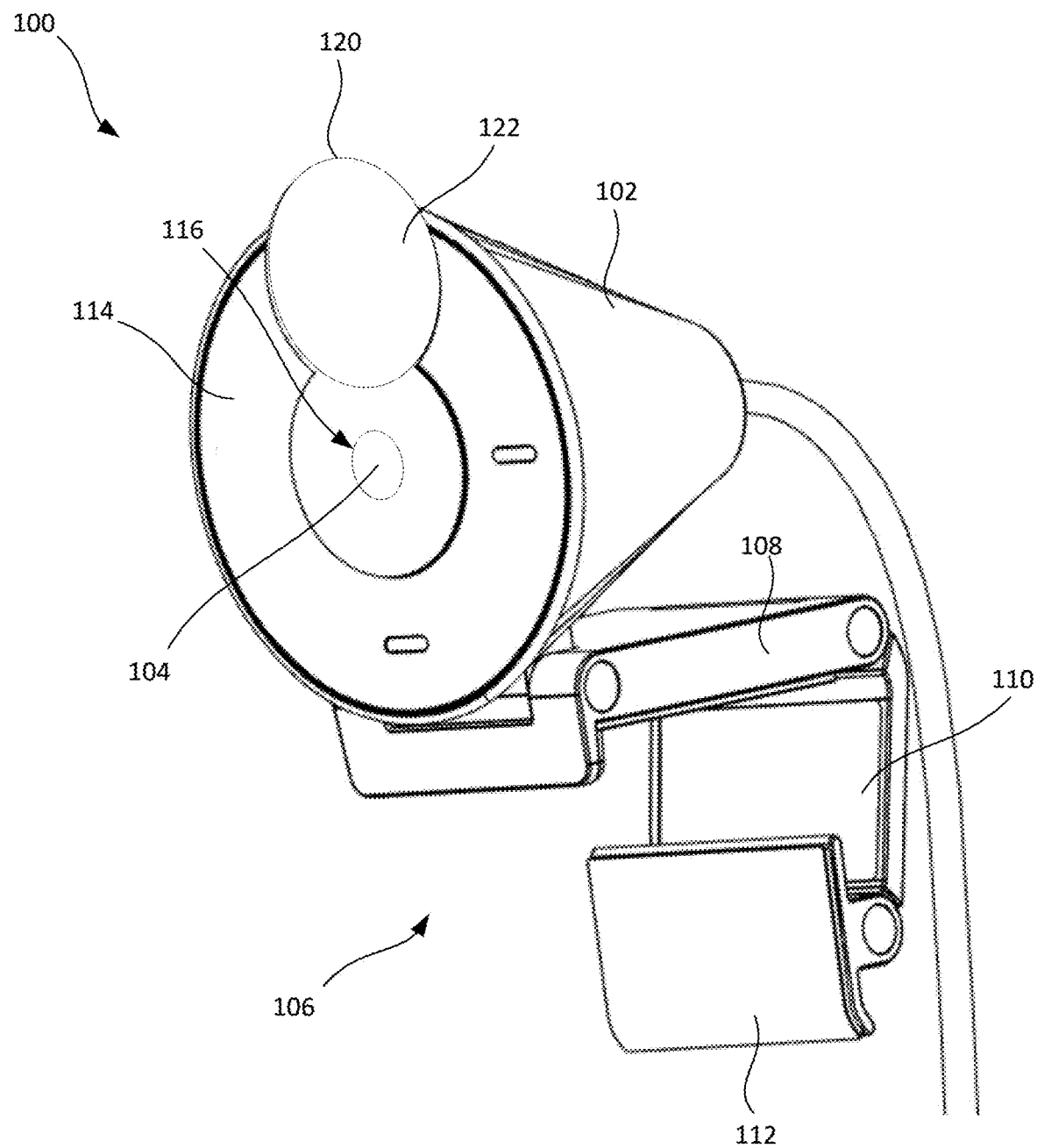
FIG. 1A is an isometric view of a webcam according to embodiments of the present invention.

Turning now to FIG. 1A, a webcam 100 is illustrated. Webcam 100 may include a housing 102 that may contain the internal components of the webcam 100. For example, the camera lens(es) 104, processing components, power components, microphone components, and/or other electronic components may be contained within the housing 102. As illustrated, the housing 102 has a generally frusto-conical shape, however the housing 102 may have any three-dimensional shape to meet the functionality and/or aesthetic needs of a particular application. For example, the housing 102 may have a generally rectangular prism shape, a disc shape, and/or other shape. The housing 102 may include a coupling mechanism 106, such as a clip, clamp, and/or other mounting device that may be used to secure the webcam 100 to a computing device or other structure. In some embodiments, the coupling mechanism 106 may be a stand that enables the webcam 100 to be supported atop a desk, shelf, or other structure. As illustrated, the coupling mechanism 106 includes a base 108 that may be positioned atop a monitor or other substrate. A pivoting arm 110 and a foot 112 are coupled with a rear end of the base 108 and may be pivoted relative to the base 108 such that the foot 112 is positioned against a rear surface of the monitor to help maintain the webcam 100 in a desired position atop the monitor.

The housing 102 may include a front cover 114 that may face toward the user (e.g., away from the monitor). The front cover 114 may help seal the front end of the housing 102 to create a finished appearance and to prevent the internal components of the webcam 100 from being exposed. As illustrated, the front cover 114 has a circular shape, however the front cover 114 may have any shape to match and couple with the sidewalls of the housing 102 and/or to meet the functionality and/or aesthetic needs of a particular application. The front cover 114 may define a lens aperture 116 that extends through a thickness of the front cover 114 and that may be aligned with the lens(es) 104 of the webcam 100 and may enable the lens(es) 104 to capture images. The front cover 114 may include additional features, such as one or more microphone apertures, status lights, and the like. The front cover 114 may further define a mounting aperture 118 that may extend through the thickness of the front cover 114. The mounting aperture 118 may be used to secure a privacy shutter 120 to the front cover 114. The mounting aperture 118 may be aligned with the lens aperture 116 along a vertical axis extending through the lens aperture 116 in some embodiments. For example, the mounting aperture 118 may be directly above or below the lens aperture 116. In other embodiments, the mounting aperture 118 may be laterally offset from the vertical axis extending through the lens aperture 116. As illustrated, the lens aperture 116 is centered within the front cover 114, with the mounting aperture 118 positioned above the lens aperture 116. However, it will be appreciated that in various embodiments the lens aperture 116 and/or mounting aperture 118 may be laterally offset from a center of the front cover 114.

Figure 1B:
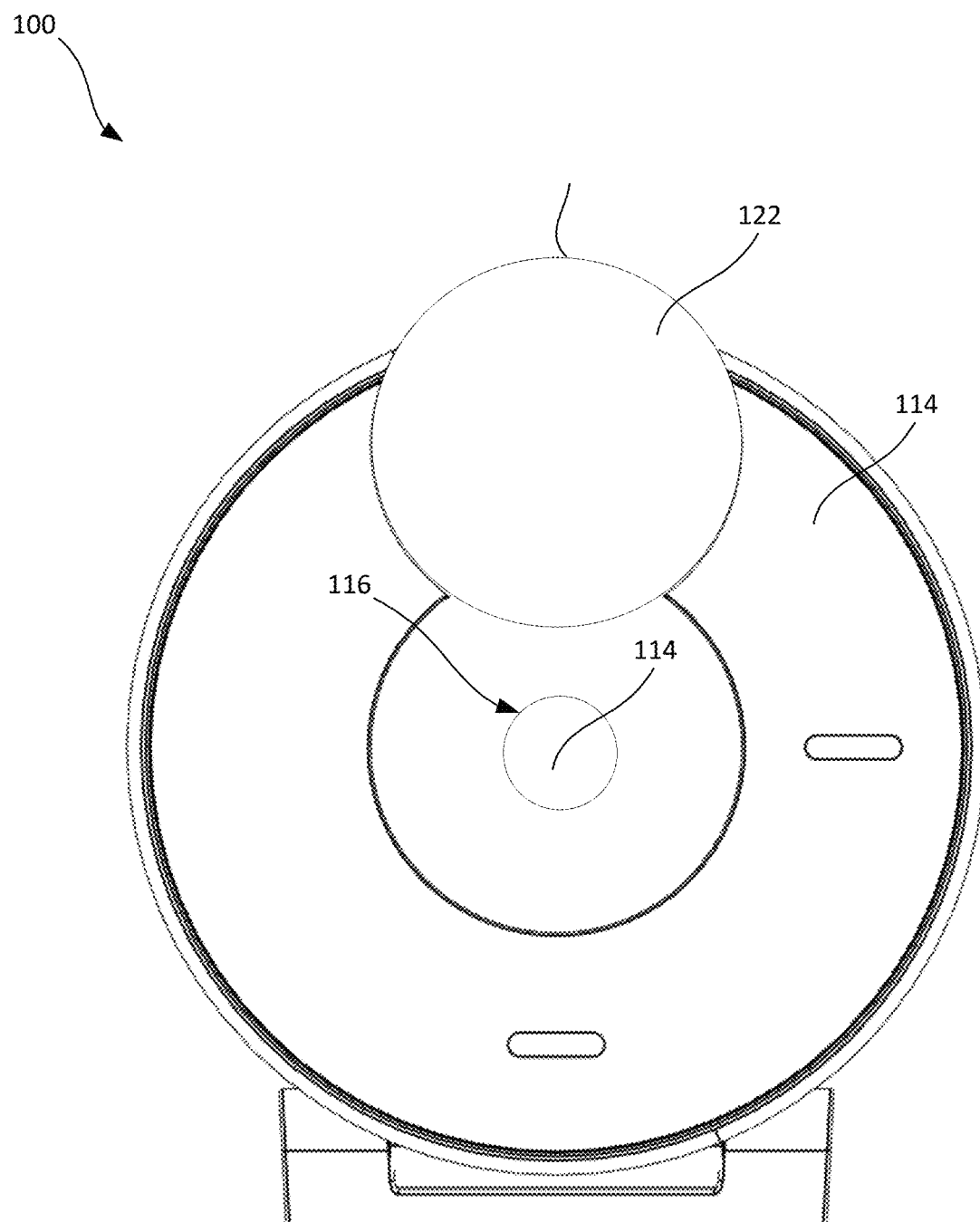
FIG. 1B is a front elevation view of the webcam of FIG. 1A with a privacy shutter in an open position according to embodiments of the present invention.
Figure 1C:
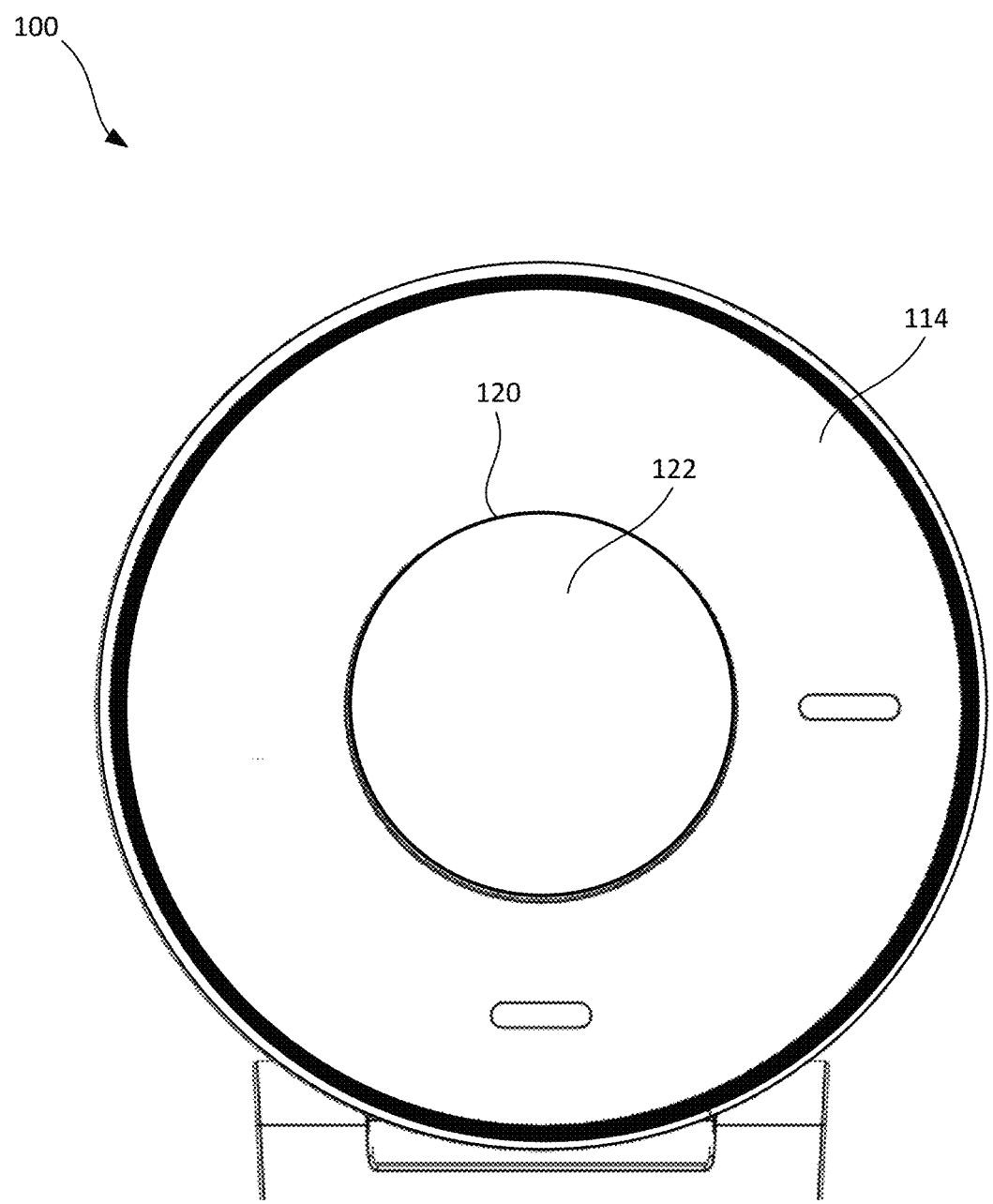
FIG. 1C is a front elevation view of the webcam of FIG. 1A with the privacy shutter in a closed position according to embodiments of the present invention.

As noted above, a privacy shutter 120 may be coupled with the front cover 114. The privacy shutter 120 may include a cover member 122 that is positioned forward of a front surface of the front cover 114. The cover member 122 may be sized to be able to cover the lens aperture 116 when in a closed position and to expose the lens aperture 116 when in an open position. As will be discussed in greater detail below, the cover member 122 may be rotated about an axis (e.g., a central axis of the mounting aperture 118) to move between the open position (as illustrated in FIGS. 1A and 1B) and the closed position (as illustrated in FIG. 1C). In the open position, the full lens aperture 116 may be exposed. In some embodiments, the cover member 122 may be sized and positioned such that when in the open position a portion of the cover member 122 extends beyond or otherwise outside of a periphery of the front cover 114. Such a design may make it easier for a user to engage the cover member 122 with the user's hand to manipulate the cover member 122 to the closed position. For example, the user may slide a portion of the user's hand over the top of the housing 102 until the hand contacts a side of the cover member 122. The user may then continue to force the cover member 122 sideways to rotate the cover member 122 about the axis to move the cover member 122 to the closed position. In addition to improving the ease of moving the privacy shutter 120 between the open and closed positions, sizing the cover member 122 such that a portion of the cover member 122 extends beyond the periphery of the front cover 114 when in the open position may provide a visual indication of whether the privacy shutter 120 is in the open or closed position, even from long distances. For example, when the portion of the cover member 122 is visible beyond the periphery of the front housing 114, a user may be able to readily discern that the privacy shutter 120 is in the open position due to the change in profile shape of the webcam 100. When the portion of the cover member 122 is not visible beyond the periphery of the front housing 114, the user may be able to readily discern that the privacy shutter 120 is in the closed position since the visible profile of the webcam 100 matches the shape of the front cover 114. In the closed position the cover member 122 may completely cover the lens aperture 116 to prevent the webcam 100 from being able to capture any images. In some embodiments, the cover member 122 may be centered over the lens aperture 116 when in the closed position such that a central axis of the lens aperture 116 and a central axis of the cover member 122 are at least substantially coaxial with one another. In other embodiments, the central axes of the lens aperture 116 and the cover member 122 may be offset from one another when the privacy shutter 120 is in the closed position.

As illustrated, the cover member 122 has a circular shape that matches the shape of the front cover 114. However, the cover member 122 may have any other shape. The front cover 114 and cover member 122 may have the same shape or may have different shapes. In some embodiments, a front surface of the cover member 122 may be domed. Such a design may provide a contour that aids a user's ability to manipulate the cover member 122 between the open and closed positions. In some embodiments, a rear surface of the cover member 122 may include a friction-reducing material, which may reduce the sliding resistance between the front cover 114 and the rear surface of the cover member 122 as the cover member 122 is moved between the open position and the closed position. The friction-reducing material may also reduce or prevent any scratching or abrasive damage that may occur as a result of the sliding contact between the rear surface of the cover member 122 and the front cover 114. For example, the rear surface of the cover member 122 may include polytetrafluoroethylene (PTFE) or other friction-reducing material. In some embodiments, the PTFE (or other material) may be applied to the rear surface of the cover member 122 using an adhesive material. In some embodiments, the rear surface of the cover member 122, the friction-reducing material, and/or other adhesive material may be at least substantially opaque (e.g., at least 75% opaque, at least 80% opaque, at least 85% opaque, at least 90% opaque, at least 95% opaque, at least 97% opaque, at least 99% opaque, or more). This may enable the rear surface of the cover member 122 to help block out light from the lens 104 and create a darker environment for the lens 104 when the privacy shutter 120 is in the closed position. In some embodiments, the webcam 100 may include a light sensor and may be programmed to shut off the video feed when a light level is below a threshold amount. The opaqueness of the rear surface of the cover member 122, the friction-reducing material, and/or other adhesive material may drop the light levels detected by the sensors below the threshold amount when the privacy shutter 120 is in the closed position to trigger the webcam 100 to cease recording.

Figure 1D:
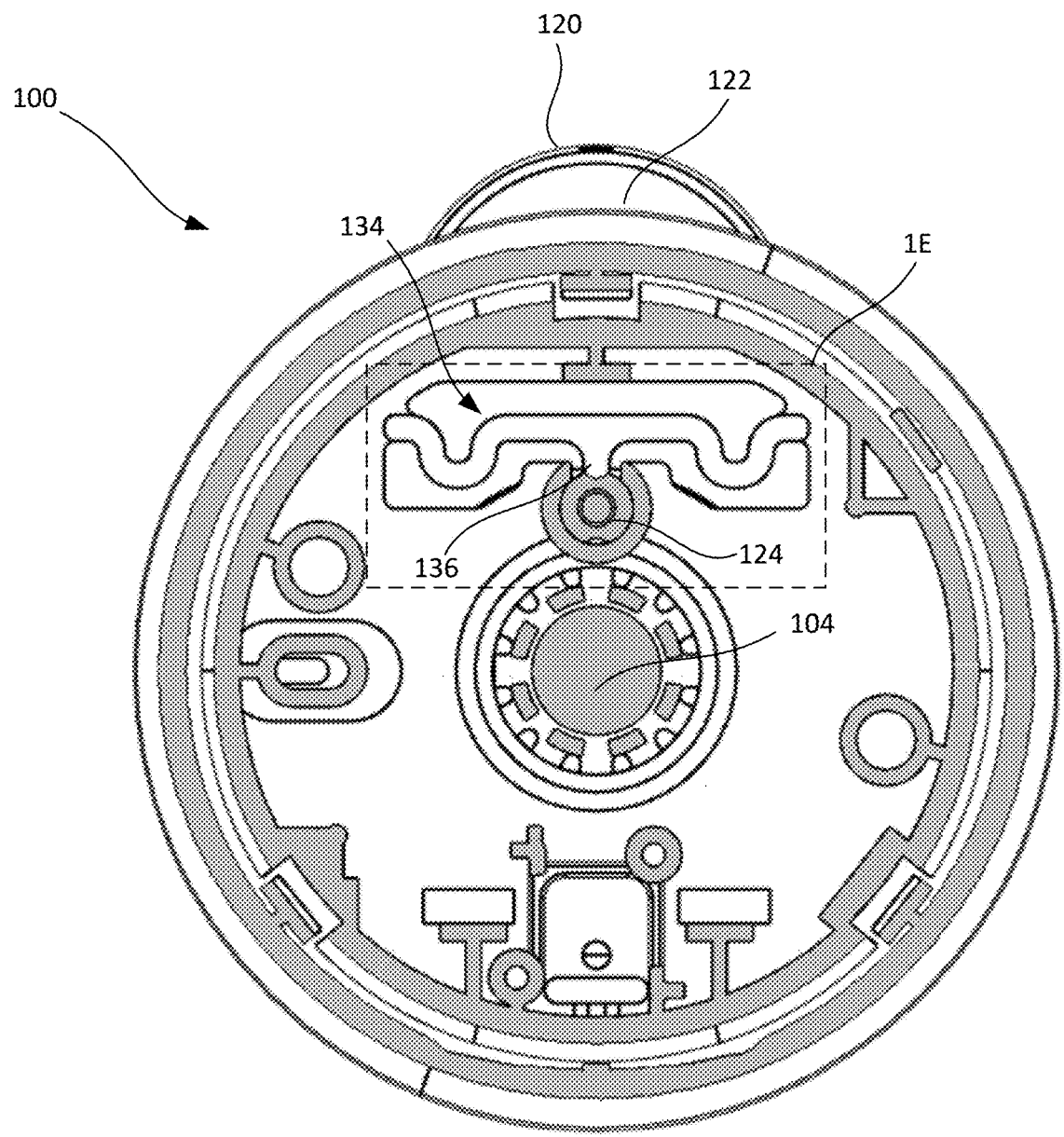
FIG. 1D is a cross-sectional rear elevation view of a living hinge of the webcam of FIG. 1A according to embodiments of the present invention.
Figure 1E:
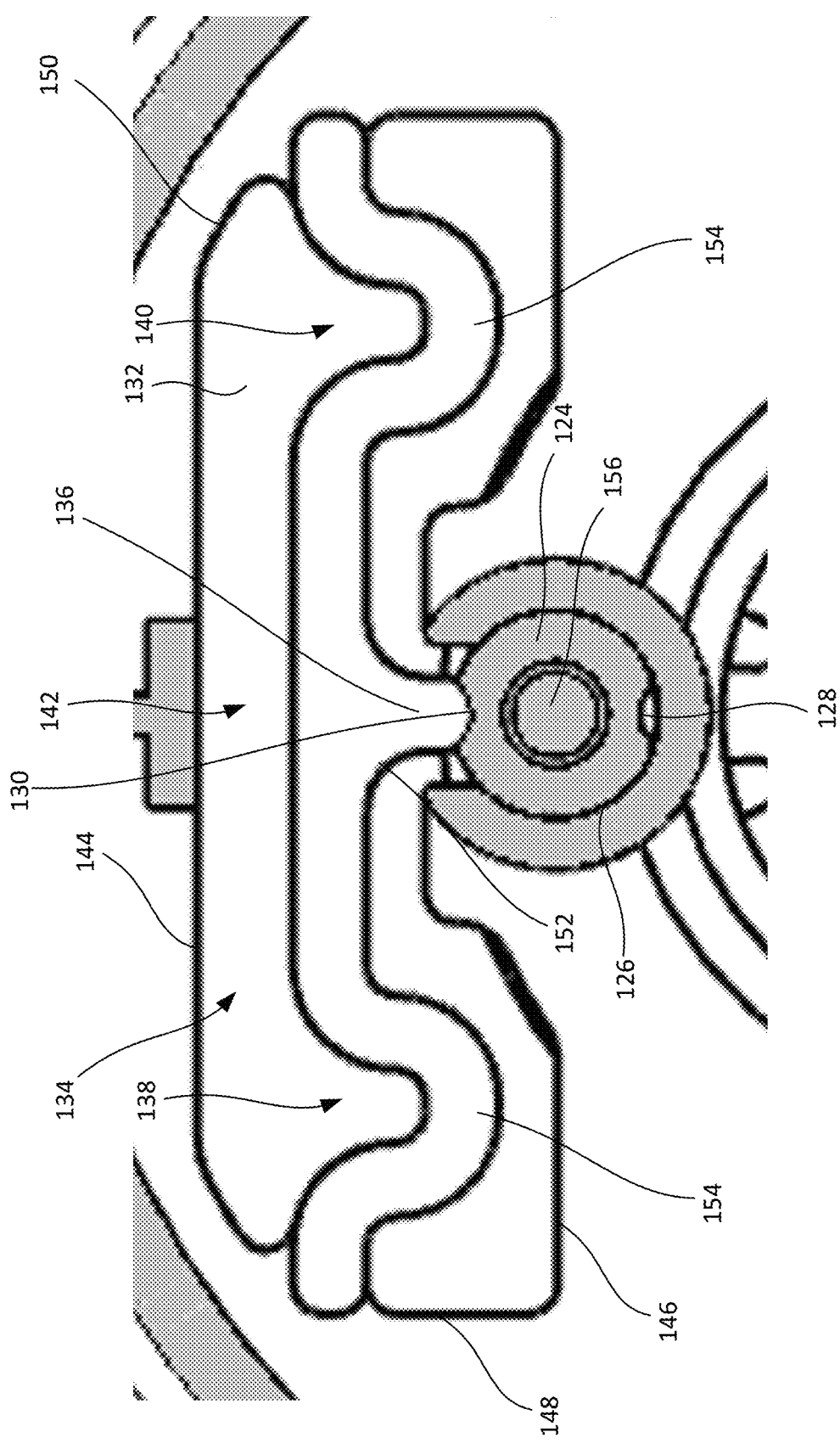
FIG. 1E is a cross-sectional rear elevation view of a living hinge of the webcam of FIG. 1A according to embodiments of the present invention.

To facilitate the rotatable coupling of the privacy shutter 120 with the housing 102, the privacy shutter 120 may include a post 124 that may extend from the rear surface of the cover member 122. The post 124 may be offset from a center of the cover member 122 such that rotation of the cover member 122 about a central axis of the post 124 causes a relative change in position of the cover member 122. The post 124 may be disposed within the mounting aperture 118 such that a portion of the post 124 extends through a thickness of the front cover 114. As best illustrated in FIGS. 1D and 1E, the post 124 may be generally cylindrical in shape such that a peripheral surface 126 of the post 124 has a generally circular cross-section. A diameter of the post 124 may be slightly (e.g., less than 5%, less than 3%, less than 1%, or less) smaller than a diameter of the mounting aperture 118 such that the post 124 may be rotatable within the mounting aperture 118, without generating much or any nutation. In some embodiments, the post 124 and/or an interior of the mounting aperture 118 may include a lubricant or other friction-reducing material that may help improve the smoothness of relative rotation between the post 124 and the mounting aperture 118 and that may help reduce abrasive wear as a result of such relative rotation. In a particular embodiment, the friction-reducing material may include a nanoplastic coating, however other lubricants (including PTFE) are possible in various embodiments. The peripheral surface 126 of the post 124 may define a first notch 128 and a second notch 130 that are spaced apart from one another. In some embodiments, the first notch 128 and the second notch 130 may be positioned opposite one another (e.g., 180 degrees) about the peripheral surface 126.

A rear surface of the front cover 114 (and/or another substrate coupled with the front cover 114) may define a void 132. A living hinge 134 may be disposed within the void 132. The living hinge 134 may include a protruding nub 136 that may be translated along a longitudinal axis of the protruding nub 136. The protruding nub 136 may be positioned in alignment with a center of the post 124 such that the protruding nub 136 may be selectively engageable with each of the first notch 128 and the second notch 130. For example, when the cover member 122 and the post 124 are rotated to the closed position, a distal end of the protruding nub 136 may be seated within the first notch 128. When the cover member 122 and the post 124 are rotated to the open position, the distal end of the protruding nub 136 may be seated within the second notch 130. A neutral position of the protruding nub 136 may be in the notch-engaged position such that as the protruding nub 136 is moved out of engagement with one of the notches to move the cover member 122 between the open position and the closed position, the protruding nub 136 is displaced away from the post 124. When the protruding nub 136 is moved into alignment with one of the notches, the protruding nub 136 may snap into and/or otherwise translate along its longitudinal axis and engage with the respective notch. In some embodiments, the post 124 may include only a single notch that may maintain the cover member 122 in either the open position or the closed position. For example, as illustrated, the cover member 122 extends above the post 124 when in the open position. Engagement of the notch and the protruding nub 136 may ensure that gravity does not cause the cover member 122 to rotate downwards toward the closed position in the event that the cover member 122 is not perfectly centered over the post 124. However, in the closed position, gravity may assist in holding the cover member 122 in place. In other embodiments in which the cover member 122 extends below the post 124 when in the open position, the engagement of the notch and the protruding nub 136 may be required to secure the cover member 122 in the closed position.

The engagement of the protruding nub 136 with either the first notch 128 or the second notch 130 may maintain the privacy shutter 120 in a desired position (e.g., in the closed position or the open position) until a user manually rotates the cover member 122 to change the desired position. Additionally, during rotation of the cover member 122, engagement of the protruding nub 136 with either the first notch 128 or the second notch 130 may provide the user with tactile feedback that alerts the user when the privacy shutter 120 has been fully moved to the open position or the closed position. The size of the notches may be selected to provide the user with sufficient tactile feedback, as well as to provide sufficient holding force to maintain the privacy shutter in the open or closed position until the user manipulates the privacy shutter to a different position. For example, each of the first notch 128 and the second notch 130 may have a depth of between about 0.2 mm and 0.6 mm, between about 0.25 mm and 0.55 mm, between about 0.3 mm and 0.5 mm, between about 0.35 mm and 0.45 mm, or about 0.4 mm. Depths shallower than 0.2 mm may provide insufficient tactile feel for users and/or may provide insufficient holding force to prevent the cover member 122 from moving between the open position and the closed position. Notches that are deeper than 0.6 mm may make it difficult for a user to move the cover member 122 between the open position and the closed position and/or may increase stress on the protruding nub 136 as the protruding nub 136 is forced out of engagement with one of the notches. This added stress may ultimately lead to a premature failure of the protruding nub 136. In some embodiments, notches having depths of between about 0.2 mm and 0.6 mm may provide holding forces of between 5 N and 10 N. In other words, a force of at least 5 N to 10 N must be applied to the cover member 122 to force the protruding nub 136 out of engagement with one of the notches to move the cover member 122 between the open position and the closed position.

In some embodiments, each of the first notch 128 and the second notch 130 may have a generally arc shape. A radius of the arc shape may be constant and/or may vary across a width of the respective notch. The arc shape may enable the notch to help guide the protruding nub 136 into the notch when a distal tip of the protruding nub 136 contacts a contoured surface of the notch. The bias of the protruding nub 136 (from the living hinge 134) may then push the protruding nub 136 into a center of the notch. Similarly, the arc shape may provide a slope that makes it easier for the user to rotation the protruding nub 136 out of engagement with the notch when moving the cover member 122 between the open position and the closed position. In some embodiments, each of the first notch 128 and the second notch 130 may have a width of between about 0.5 mm and 2 mm, between about 0.75 mm and 1.75 mm, between about 1 mm and 1.5 mm, or about 1.25 mm. In some embodiments, a width of each of the first notch 128 and the second notch 130 may extend for between about 10 degrees and 40 degrees of the peripheral surface 126, between about 15 degrees and 35 degrees, between about 20 degrees and 30 degrees, or about 25 degrees.

As noted above, the rear surface of the front cover 114 may define a void 132 that extends through a portion of the thickness of the front cover 114. The void 132 may defined by one or more walls, such as a top wall, a bottom wall, and/or one or more sidewalls, although various configurations are possible. For example, as illustrated, the void 132 includes a top wall 144, a nonlinear bottom wall 146, two sidewalls 148, and two angled walls 150 that each couple one of the sidewalls with the top wall 144. It will be appreciated that the void 132 may have any other shape in various embodiments. The living hinge 134 be formed from the material that defines the void 132, with the living hinge 134 being disposed within and filling a portion of the void 132. The presence of the void 132 may provide the living hinge 134 with room to translate when the protruding nub 136 is moved in and out of engagement with one of the first notch 128 and the second notch 130. The living hinge 134 may include a first end region 138, a second end region 140, and a medial region 142 that is disposed between the first end region 138 and the second end region 140. The protruding nub 136 may protrude from the medial region 142, which may be aligned with a central axis of the mounting aperture 118 in some embodiments. The protruding nub 136 may have a width that substantially matches a width of each of the notches, which may help seat the protruding nub 136 within the respective notch when the privacy shutter 120 is in the open position or the closed position. In some embodiments, the protruding nub 136 may have a curved distal end. For example, the distal end of the protruding nub 136 may have a contour that substantially corresponds to the contour of each of the notches such that when the protruding nub 136 is seated within one of the notches, a substantial portion of the distal end of the protruding nub 136 may contact surfaces defining the notch. In some embodiments, the protruding nub 136 may have a length of between about 1 mm and 3 mm, between about 1.25 mm and 2.75 mm, between about 1.5 mm and 2.5 mm, between about 1.75 mm and 2.25 mm, or about 2 mm. Protruding nubs 136 that are longer than 3 mm may develop larger stresses as the protruding nub 136 is forced out of a given notch. In some embodiments, the protruding nub 136 may include a fillet 152 that may help reinforce the protruding nub 136 and may enable the protruding nub 136 to withstand larger forces.

Each of the first end region 138 and the second end region 140 may each be coupled with one of the walls that defines the void 132. For example, as illustrated, each of the first end region 138 and the second end region 140 extend from an area proximate a junction of one of the sidewalls 148 and one of the angled walls 150. It will be appreciated that each of the first end region 138 and the second end region 140 may be coupled with other wall portions, such as the top wall 144 and/or the bottom wall 146, or from a medial portion of a sidewall 148 and/or angled wall 150. Each of the first end region 138 and the second end region 140 may include a curved portion 154. For example, as illustrated each curved portion 154 may extend downward from the connection with the walls of the void 132 and may have a generally semicircular shape before extending to the medial region 142. In some embodiments, each curved portion 154 may start and end at a same vertical position, while in other embodiments the start and end of each curved portion 154 may be at different vertical positions. The presence of the curved portions 154 may help the ability of the living hinge 134 to flex to move the protruding nub 136 into and out of engagement with the first notch 128 and the second notch 130. For example, as the cover member 122 is moved between the open position and the closed position the protruding nub 136 is forced away from the post 124. As the protruding nub 136 is forced away from the post, the medial region 142 of the living hinge 134 may be flexed upward relative to the first end region 138 and the second end region 140. To facilitate this flexing, opposing sides of each curved portion 154 may be pinched toward one another and/or an apex of each curved portion 154 may be lifted relative to a neutral position of the curved portions 154. When the protruding nub 136 is re-engaged with either the first notch 128 or the second notch 130, while reducing the stress on the living hinge 134. In some embodiments, the stress on the living hinge 134 may be less than about 40 N/m², less than about 35 N/m², less than about 30 N/m², less than about 25

N/m², less than about 20 N/m², or less when the protruding nub 136 is displaced from a respective one of the first notch and the second notch.

As illustrated, the medial region 142 is generally linear, although other configurations are possible in various embodiments. The protruding nub 136 may be centered within the medial region 142, and the living hinge 134 may be symmetrical in some embodiments. This may help ensure that the protruding nub 136 is able to translate substantially along its longitudinal axis without generating uneven forces on the first end region 138 and the second end region 140.

The living hinge 134 (and possibly the rest of front cover 114) may be formed from a material that exhibits a high tensile yield stress, which may enable the living hinge 134 to be repeatedly flexed during movement of the privacy shutter 120 between the open position and the closed position without failure of the living hinge 134. In some embodiments, the living hinge 134 may be formed from a polymeric material, such as polycarbonate, or other materials having a tensile yield strength of at least 8500 psi, at least 9000 psi, at least 9500 psi, or more. In some embodiments, the living hinge 134 may be molded and/or otherwise formed into the material forming the front cover 114, which may eliminate the need for any extra components, fasteners, or other coupling features. For example, the void 132 and living hinge 134 may be formed directly into a rear surface of the front cover 114. The front cover 114 may be a single piece of material or may include multiple layers of material that are coupled together, with the living hinge 134 formed in a rear (and possibly rearmost) surface of the front cover 114.

Figure 1F:
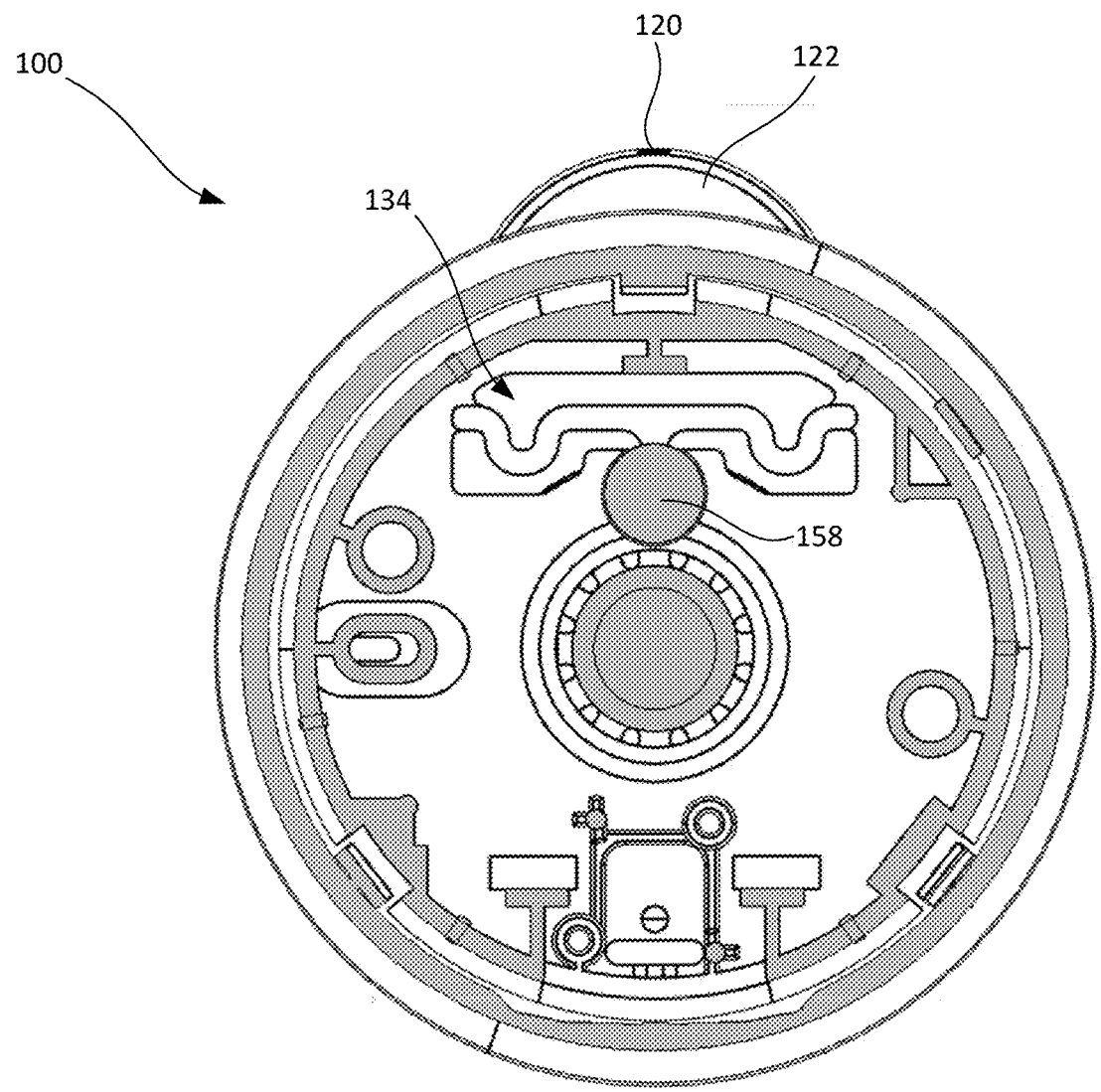
FIG. 1F is a cross-sectional rear elevation view of a living hinge of the webcam of FIG. 1A according to embodiments of the present invention.

In some embodiments, a rear surface of the post 124 may define a central aperture 156 that may receive a fastener that may secure the post 124 within the mounting aperture 118. In a particular embodiment, the central aperture 156 may be threaded and may receive a screw 158 as illustrated in FIG. 1F. The head of the screw 158 may be sufficiently large such (e.g., larger than the diameter of the mounting aperture 118) that the head prevents the post 124 from being pulled through the mounting aperture 118. Additionally, by tightening and loosening the screw 158, the tension on the post 124 may be adjusted, which may enable the amount of force required to move the privacy shutter 120 between the open position and the closed position to be adjusted.

Figure 2:
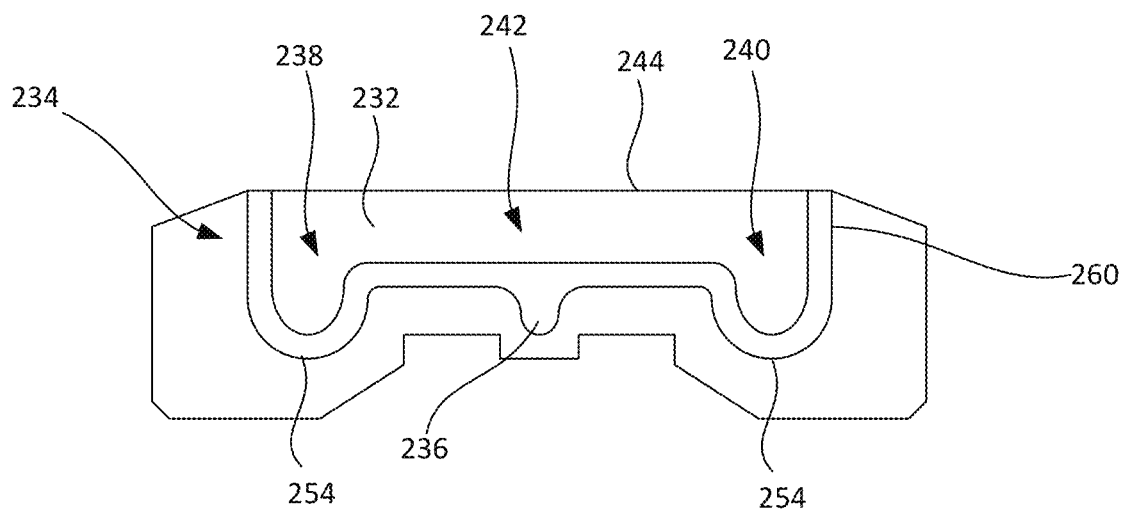
FIG. 2 is a cross-sectional rear elevation view of a living hinge of a webcam according to embodiments of the present invention.

It will be appreciated that living hinge 134 merely illustrates one example of a living hinge design that may be incorporated into webcam 100 and that numerous variations exist. For example, the first end region and the second end region may be coupled with a top wall and/or bottom wall of the front cover that defines void 132. FIG. 2 illustrates an embodiment of a living hinge 234 that may be used in place of living hinge 134 in some embodiments. Living hinge 234 may be formed within a void 232 that is defined by a number of walls. As illustrated, a first end region 238 and a second end region 240 of the living hinge 234 may extend from a top wall 244 defining the void 232. For example, each of the first end region 238 and the second end region 240 may include a linear segment 260 that extends downward from the top wall 244 and flows into a respective curved portion 254. Each curved portion 254 may include an arc of constant and/or variable curvature. In some embodiments, the curved portions 254 may each be generally semicircular, although other angular sizes of curves are possible in various embodiments. Each curved portion 254 may be coupled with a medial region 242 that extends between and couples the opposing curved portions 254. A protruding nub 236 of the living hinge 234 may be disposed within a center of the medial region 242.

Figure 3:
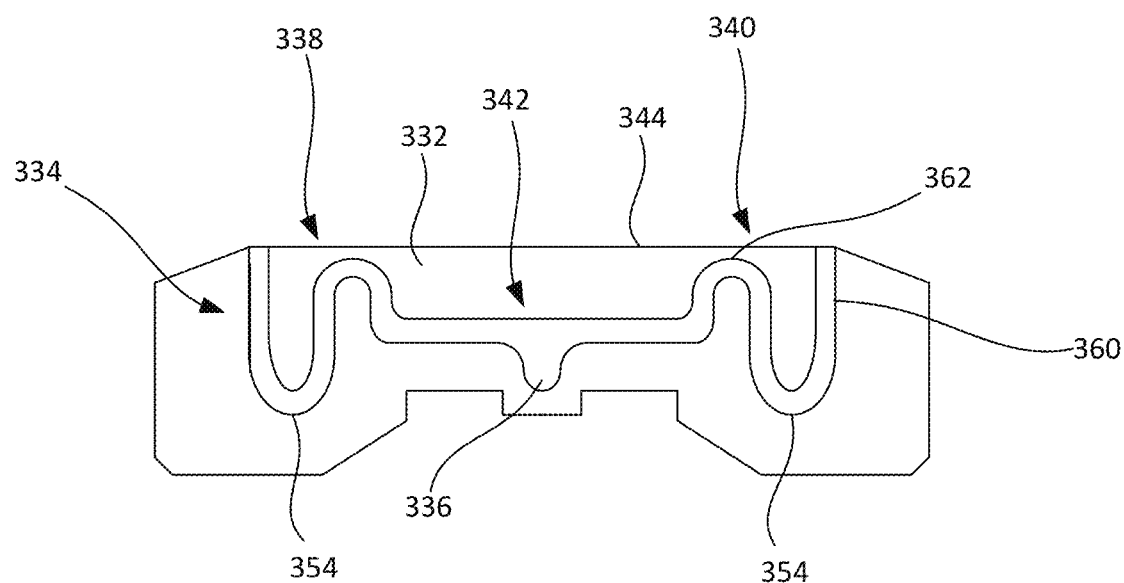
FIG. 3 is a cross-sectional rear elevation view of a living hinge of a webcam according to embodiments of the present invention.

FIG. 3 illustrates another embodiment of a living hinge 334 that may be used in place of living hinge 134 in some embodiments. Living hinge 334 may be formed within a void 332 that is defined by a number of walls. As illustrated, a first end region 338 and a second end region 340 of the living hinge 334 may extend from a top wall 344 defining the void 332. For example, each of the first end region 338 and the second end region 340 may include a linear segment 360 that extends downward from the top wall 344 and flows into a respective curved portion 354. Each curved portion 354 may include an arc of constant and/or variable curvature. In some embodiments, the curved portions 354 may each be generally semicircular, although other angular sizes of curves are possible in various embodiments. Each curved portion 354 may be coupled with an additional curved portion 362 (either directly or via one or more intervening segments, such as a linear segment). For example, each curved portion 354 may extend downward beyond a medial region 342 and each additional curve portion 362 may extend upward beyond the medial region 342. Each curved portion 354 and additional curved portion 362 may be inverted relative to one another. The medial region 342 may extend between and couple opposing additional curved portions 362. A protruding nub 336 of the living hinge 334 may be disposed within a center of the medial region 342.

It will be appreciated that the living hinges described herein are merely provided as illustrative examples and that numerous variations are possible. The living hinges may include any number of curved portions having any shape. For example, the curved portions may be bulbous, (e.g., include more than 180 degrees of a circle) rather than semicircular in some embodiments. The first and second end regions may be coupled with any of the walls defining the void, including the bottom wall in some embodiments. Additionally, while illustrated with the living hinge being positioned above the post 124, the living hinge may be positioned at any location about the post that enables the protruding nub to engage with the first and second notches in various embodiments.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A webcam, comprising:
   a housing comprising a front cover, the front cover defining a lens aperture and a mounting aperture, wherein a rear surface of the front cover defines a void, wherein a living hinge is disposed within the void, the living hinge having a protruding nub;
   a privacy shutter comprising a cover member and a generally cylindrical post extending from a rear surface of the cover member, the post being disposed within the mounting aperture, wherein:
   a peripheral surface of the post defines a notch; and
   the protruding nub is seated within the notch when the privacy shutter is in a closed position.

2. The webcam of claim 1 wherein:
   the living hinge comprises a first end region, a second end region, and a medial region disposed between the first end region and the second end region;
   the first end region comprises a first curved portion;
   the second end region comprises a second curved portion; and
   the protruding nub protrudes from the medial region.

3. The webcam of claim 2 wherein:
   each of the first end region and the second end region is coupled with one or both of a top surface of a portion of the rear surface defining the void and a side surface of the portion of the rear surface defining the void.

4. The webcam of claim 1 further comprising:
   a screw that couples the post with the front cover of the webcam housing, wherein rotation of the screw adjusts an amount of force needed to move the privacy shutter between the closed position and an open position.

5. The webcam of claim 1 wherein:
   a length of the protruding nub is between about 1 mm and 3 mm.

6. The webcam of claim 1 wherein:
   the living hinge comprises polycarbonate.

* * * * *